United States Patent Office 3,463,815
Patented Aug. 26, 1969

3,463,815
BENZHYDRYLOXYACETAMIDE DERIVATIVES
Cornelis van der Stelt, Reaellann-Haarlem, the Netherlands, assignor to N.V. Koninklijke Pharmaceutische Fabrieken v/h Brocades-Stheeman & Pharmacia Amsterdam, Netherlands, a corporation of the Netherlands
No Drawing. Filed Sept. 9, 1966, Ser. No. 578,124
Claims priority, application Great Britain, Sept. 9, 1965, 38,637/65; Sept. 23, 1965, 40,644/65
Claims priority, application Denmark, Oct. 27, 1965, 5,520/65
Int. Cl. C07c 103/22
U.S. Cl. 260—559          7 Claims

ABSTRACT OF THE DISCLOSURE

Benzhydryloxyacetamide derivatives are provided which have sedative, anticonvulsant and weed controlling activity. The new compounds have the formula:

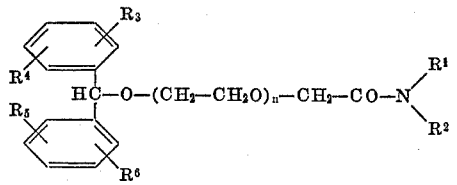

wherein $R^1$, $R^2$ and $R^3$ are the same or different and each represents an alkyl group, $R^4$, $R^5$ and $R^6$ are the same or different and each represents a hydrogen atom or an alkyl group, and $n$ represents 0 or 1.

---

This invention relates to benzhydryloxyacetamide derivatives, to processes for their preparation, and to pharmaceutical preparations containing them.

According to the present invention, there are provided the new benzhydryloxyacetamides of the general formula:

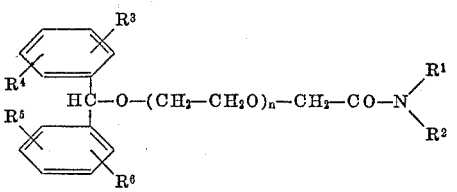

wherein $R^1$, $R^2$ and $R^3$ are the same or different and each represents an alkyl group, $R^4$, $R^5$ and $R^6$ are the same or different and each represents a hydrogen atom or an alkyl group, and $n$ represents 0 or 1. The term "alkyl group" as used in the present specification and claims means a straight or branched saturated aliphatic hydrocarbon radical having not more than four carbon atoms. Preferred compounds are those wherein $R^1$ and $R^2$ represent methyl groups and $n$ is zero, and especially those furthermore wherein $R^3$ represents a methyl or t-butyl group and $R^4$, $R^5$ and $R^6$ represent hydrogen atoms. The compounds of Formula I are therapeutically useful, possessing sedative and anticonvulsant activity; further, these compounds have weed-controlling activity. Moreover, according to another aspect of the invention, the compounds of Formula I are utilized as intermediates in the production of the corresponding compounds wherein the carbonyl, i.e., —CO—, group has been reduced to the methylene, i.e., —CH$_2$—, group, viz, the therapeutically active compounds of the formula

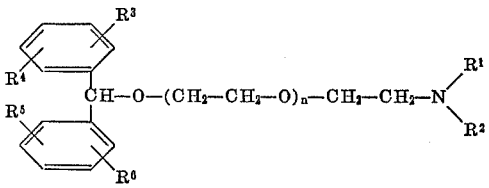

wherein the various symbols are as hereinbefore defined.

According to a further feature of the invention, the compounds of Formula I are prepared by reacting a benzhydrol derivative of the formula

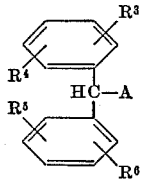

with an acetamide derivative of the formula:

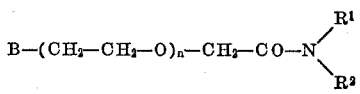

wherein $R^1$, $R^2$, $R^3$, $R^4$, $R^5$, $R^6$, and $n$ are as hereinbefore defined, and A and B are different and each represents a halogen atom or a group —OM wherein M represents a hydrogen or alkali metal atom or A and B both represent hydroxyl groups. The reaction may be carried out without a solvent for the reactants or in an inert organic solvent medium, e.g. diethyl ether or tetrahydrofuran. If concomitant with the formation of the compound of Formula I a hydrohalic acid is formed, it is preferred to conduct the reaction in the presence of an acid-binding agent such as an alkali metal amide or alkali metal hydride. When both A and B represent hydroxyl groups, the reaction is preferably carried out by heating the reactants in the presence of a dehydrating agent, such as toluene-p-sulphonic acid.

According to another feature of the invention, the compounds of Formula I are prepared by reacting an ester of an ω-benzhydryloxyacetic acid of the formula:

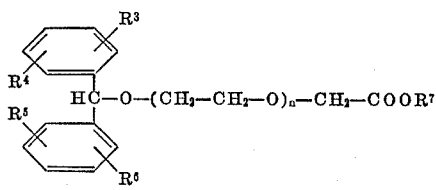

wherein $R^3$, $R^4$, $R^5$, $R^6$ and $n$ are as hereinbefore defined, and $R^7$ represents an alkyl group, with a dialkylamine of the formula:

wherein $R^1$ and $R^2$ are as hereinbefore defined. The reaction is preferably carried out in the presence of an inert organic solvent such as benzene, toluene, dimethylsulphoxide or tetrahydrofuran.

According to a further feature of the invention, the compounds of Formula I are prepared by alkylation, by methods known per se, of a compound of the formula:

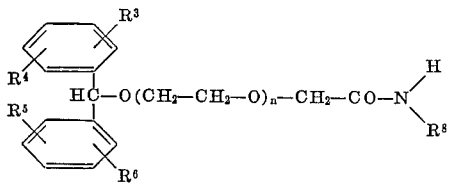

VII wherein $R^3$, $R^4$, $R^5$, $R^6$ and $n$ are as hereinbefore defined, and $R^8$ represents a hydrogen atom or an alkyl group. The reaction may be carried out in an inert organic solvent medium such as benzene, toluene or xylene. The compound of the Formula VI is preferably reacted with alkylating agents such as alkyl halides, dialkyl sulphates or potassium alkylsulphates in the presence of sodium or potassium amide or hydride.

In those instances where $n$ represents 1, the compounds of Formula I, according to still another feature of the invention, are prepared by reacting a compound of the general formula:

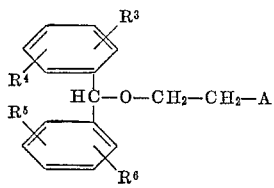

VIII with an acetamide of the general formula:

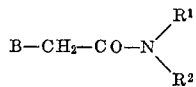

IX wherein the symbols are as hereinbefore defined. The reaction may be carried out without a solvent for the reactants or in an inert organic solvent medium, e.g. diethyl ether or tetrahydrofuran. If concomitant with the formation of the compound of Formula I a hydrohalic acid is formed, it is preferred to conduct the reaction in the presence of an acid-binding agent, such as an alkali metal hydride or amide. When both A and B represent hydroxyl groups, the reaction is preferably carried out by heating the reactants in the presence of a dehydrating agent such as toluene p-sulphonic acid.

The expression "methods known per se" as used in this specification means conventional methods for carrying out the type of reaction involved.

The following examples, in all of which the temperatures mentioned are in degrees centigrade and yields stated are by percent of the theoretical yield, illustrate the invention.

Examples I to VIII illustrate the preparation of compounds of Formula I.

Example I 40 g. of o-methyl-α-phenylbenzyl alcohol and 24 g. of N,N-dimethylmonochloroacetamide are dissolved in 300 ml. of anhydrous diethyl ether. Portionwise 10 g. of 50% sodium hydride in the form of an oily suspension is added to the solution with stirring. After all the sodium hydride is added, the mixture is stirred at room temperature for another three hours and then water is added to decompose excess sodium hydride. The ethereal layer is separated, dried with sodium sulphate, filtered and concentrated by removal of the solvent. The residue crystallizes upon addition of petroleum ether (boiling range 80–100°) to which some diethyl ether is added. There is obtained 35 g. (62% yield) of N,N-dimethyl-2-[(o-methyl - α - phenylbenzyl)oxy] acetamide, melting at 63–65°.

Analysis.—Calculated for $C_{18}H_{21}NO_2$: C, 76.30%; H, 7.47%; N, 4.94%. Found: C, 76.30%; H, 7.57%; N, 4.98%.

Example II (a) 6 g. of impure methyl o-methyl-α-phenylbenzyloxyacetate is dissolved in methanol and the solution saturated with dimethylamine. The mixture is left standing for two days and methanol is removed under reduced pressure. The residual oil is dissolved in petroleum ether and from the solution 4 g. of N,N-dimethyl-2-[(o-methyl-α-phenylbenzyl)oxy]acetamide, melting at 65–66°, is obtained by crystallization.

(b) Methyl o-methyl-α-phenylbenzyloxyacetate used as starting material can be prepared as follows:

35 g. of o-methylbenzhydrol and 4.3 g. of sodium in xylene are left standing overnight at room temperature. Then the mixture is heated at 100° for two hours. After cooling, 8.5 g. of monochloroacetic acid is added and the mixture is heated in a water bath for 20 hours. It is then cooled and extracted with 0.2 N sodium hydroxide. The alkaline solution is separated and acidified with 5 N hydrochloric acid, yielding 9 g. of o-methyl-α-phenylbenzyloxyacetic acid, melting point 101–103°. The melting point can be raised to 108–109° by further crystallizations. The o-methyl-α-phenylbenzyloxyacetic acid is converted into its methyl ester by treatment with diazomethane in diethyl ether. The solvent and residual diazomethane are distilled off and the remaining oil mainly consisting of methyl o - methyl - α - phenylbenzyloxyacetate is used for the reaction with dimethylamine without further purification.

Example III

Following the procedure described in Example I but substituting an equivalent amount of 2-(di-2,6-xylylmethoxy) ethanol for the o-methyl-α-phenylbenzyl alcohol, 2 - [2 - (di - 2,6 - xylylmethoxy)ethoxy] - N,N - dimethylacetamide is obtained in 73% yield. The melting point is 57–58.5°.

The 2-(di-2,6-xylylmethoxy)ethanol used as a starting material can be prepared as follows:

A mixture of 8 g. of 2,6,2',6'-tetramethylbenzhydrol and 30 ml. of β-chloroethanol is heated for one hour under reflux. Upon cooling, 50 ml. of water is added, whereby a precipitate is formed. This precipitate is removed by filtration, dried and recrystallized from ethanol. 9 g. of 2-(di-2,6-xylylmethoxy) ethyl chloride melting at 72–74° is obtained.

12 g. of 2-(di-2,6-xylylmethoxy)ethyl chloride and 20 g. of potassium acetate are mixed with 50 ml. of dimethyl sulphoxide and 80 ml. of xylene. The mixture is boiled for 5 hours and after cooling poured into water. The xylene solution is separated, washed with water, dried, filtered and concentrated by removal of the solvent by distillation. The residue is subjected to fractional distillation; the fraction distilling at 180–186° (at 2 mm. Hg pressure) is collected and dissolved in petroleum ether (boiling range 28–40°) and from the solution 9.5 g. (70.8% yield) of 2-(di-2,6-xylylmethoxy) ethyl acetate, melting at 67.5–69°, is obtained by crystallization.

24 g. of 2-(di-2,6-xylylmethoxy)ethyl acetate is boiled for 30 minutes with a solution of 4.5 g. of potassium hydroxide in 100 ml. of ethanol. The solution is evaporated to dryness and the residue taken up in water. The mixture is then extracted with diethyl ether. The ethereal solution is dried and filtered. Diethyl ether is distilled off leaving an oil which is dissolved in petroleum ether (boiling range 60–80°) and from the solution 20.5 g. (99% yield) of 2-(di-2,6-xylylmethoxy)ethanol, melting at 77°, is obtained by crystallization.

Example IV

Following the procedure described in Example I but substituting an equivalent amount of o-t-butyl-α-phenylbenzyl alcohol for the o-methyl-α-phenylbenzyl alcohol, 2 - [(o - tert. - butyl - α - phenylbenzyl)oxy] - N,N - dimethyl acetamide, melting at 90–91°, is obtained in 81% yield.

*Analysis.*—Calculated for $C_{21}H_{27}NO_2$: C, 77.50%; H, 8.35%; N, 4.30%. Found: C, 77.44%; H, 8.44%; N, 4.40%.

Example V 2.5 g. of (o-methyl-α-phenylbenzyloxy)acetamide is dissolved in 20 ml. of toluene. To the solution 0.5 g. of a 50% sodium hydride suspension is added. The mixture is boiled under reflux for 15 minutes and then cooled to room temperature. 4 g. of methyl iodide is added. The reaction mixture is boiled under reflux for about half an hour, cooled and again treated with 0.5 g. of 50% sodium hydride suspension and with 4 g. of methyl iodide. The mixture is refluxed for one hour and 30 ml. of water is added. The toluene solution is separated, dried with sodium sulphate and filtered. The solution is concentrated and from the resulting oil is obtained 2 g. (70% yield) of N,N-dimethyl-(o-methyl-α-phenylbenzyloxy)acetamide by crystallization.

Example VI

Following the procedure described in Example I but substituting an equivalent amount of p-methyl-α-phenylbenzyl alcohol for the o-methyl-α-phenylbenzyl alcohol, N,N - dimethyl - 2 - [(p-methyl - α - phenylbenzyl)oxy]-acetamide is obtained by fractional distillation, it being the fraction distilling at 180–190° (0.3 mm. Hg pressure).

*Analysis.*—Calculated for $C_{18}H_{21}NO_2$: C, 76.30%; H, 7.47%; N, 4.94%. Found: C, 76.37%; H, 7.56%; N, 4.87%.

Example VII 2.7 g. of N-methyl-(o-methyl-α-phenylbenzyloxy)acetamide is dissolved in 15 ml. of toluene and 15 ml. of dimethylsulphoxide. 0.5 g. of a 50% sodium hydride suspension is added and the mixture is boiled under reflux for 15 minutes. The brown-reddish reaction mixture is cooled to room temperature and 3 g. of methyl iodide is added. The reaction mixture turns yellow and the temperature rises to 60°. The mixture is refluxed for 30 minutes and cooled. 30 ml. of water is added. The non-aqueous layer is separated, washed three times with water and dried with sodium sulphate. By filtration and removal by distillation of the solvents 2.5 g. of an oil is obtained from which is obtained by crystallization 1.8 g. of N,N-dimethyl-(o-methyl-α-phenylbenzyloxy)acetamide, melting at 62–63°.

Example VIII

A mixture of 10.3 g. of N,N-dimethyl-2-hydroxyacetamide, 19.8 g. of o-methylbenzhydrol and 17.2 g. of toluene-p-sulphonic acid is heated under reduced pressure for three hours at a temperature of 140°. The mixture is cooled and extracted with diethyl ether. The ethereal solution is washed with 2 N sodium hydroxide solution, dried with sodium sulphate, filtered and concentrated by evaporation of the solvent. The remaining oil is distilled under reduced pressure and the fraction distilling at about 180° (0.5 mm. Hg pressure) collected and dissolved in petroleum ether (boiling range 80–100°) to which some diethyl ether is added, from which solution pure N,N-dimethyl (o-methyl-α-phenylbenzyloxy)acetamide, melting at 62–64°, is obtained by crystallization.

The compounds of Formula II are prepared according to the invention from the compounds of Formula I by reducing the carbonyl group to methylene of methods known per se. Suitable reducing agents are for example lithium aluminum hydride or diborane. The reaction is preferably carried out in an inert organic medium such as diethyl ether or tetrahydrofuran. Examples IX to XII illustrate the preparation according to the invention of compounds of Formula II.

Example IX

To a solution of 15 g. of N,N-dimethyl-2-[(o-methyl-α-phenylbenzyl)oxy]acetamide in 150 ml. of anhydrous diethyl ether is added portionwise with stirring and while refluxing 2 g. of lithium aluminum hydride. After the addition is completed, refluxing is continued overnight. The reaction mixture still contains some lithium aluminum hydride which is decomposed by the addition of water. The mixture is filtered, the ethereal solution separated and dried over sodium sulphate. Diethyl ether is removed from the ethereal solution by distillation. To the residue ethanol is added and the pH of the solution is adjusted to 5.4 by addition of an ethanolic hydrogen chloride solution. Next, diethyl ether is added to the point where, after shaking, some turbidity just remains. After cooling of the solution there is obtained 11.0 g. of N,N-dimethyl - 2 - [(o - methyl - α - phenylbenzyl)oxy]ethylamine hydrochloride (72% yield), melting at 152–154°.

Example X

Following the procedure described in Example IX but substituting an equivalent amount of N,N-dimethyl-2-[(p-methyl-α-phenylbenzyl)oxy]acetamide for the N,N-dimethyl - 2 - [(o - methyl - α - phenylbenzyl)oxy]acetamide, N,N-dimethyl-2-[(p-methyl-α-phenylbenzyl)oxy]-ethylamine hydrochloride, melting at 150–152°, is obtained.

Example XI

Following the procedure described in Example IX but substituting an equivalent amount of 2-[(o-tert.-butyl-α-phenylbenzyl)oxy]-N,N-dimethylacetamide for the N,N-dimethyl-2-[(o-methyl-α-phenylbenzyl)oxy]acetamide, 2-[(o-tert. - butyl - α - phenylbenzyl)oxy] - N,N - dimethylethylamine hydrochloride melting at 178–180°, is obtained.

Example XII

Following the procedure described in Example IX but substituting an equivalent amount of 2-[2-(di-2,6-xylylmethoxy)ethoxy]-N,N-dimethylacetamide for the N,N-dimethyl - 2 - [(o - methyl - α - phenylbenzyl)oxy]acetamide, 2-[2-(di-2,6-xylylmethoxy)ethoxy]-N,N-dimethylethylamine hydrochloride, melting at 133–135°, is obtained.

The invention includes within its scope pharmaceutical preparations containing, as active ingredient, at least one of the therapeutically active compounds of Formula I in association with a pharmacologically acceptable carrier. The preparations may take any of the forms customarily employed for administration of therapeutically active substances, but the preferred types are those suitable for oral administration and especially tablets, pills and capsules including the substance. The tablets and pills may be formulated in the usual manner with one or more pharmacologically acceptable diluents or excipients, for example lactose or starch, and include materials of a lubricating nature, for example calcium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e. as a suspension or emulsion in sterile water or an organic liquid usually employed for injectable preparations, for example a vegetable oil such as oilve oil, or a sterile solution in an organic solvent.

The percentage of active ingredient in the pharmaceutical preparations will vary with the compound employed, the mode of administration, the intended period of treatment and the desired thereapeutic effect. Generally, preparations for oral administration should normally contain at least 15% by weight of active compound. For oral administration as sedatives and as anticonvulsants, suitable daily dosages of the compounds of the present invention are about from 25 to 300 mg.

Examples XIII and XIV illustrate pharmaceutical preparations according to the invention.

Example XIII

A basis granulate is prepared from the following ingredients:

| | |
|---|---:|
| Saccharum lactis | g.. 800 |
| Amylum Solani | g.. 200 |
| Amylum Solani in water (5% solution) | ml.. 200 |

These ingredients are mixed, granulated and dried at 50°. The mixture is passed through a sieve of 25 mesh. For the preparation of tablets weighing 250 mg. the following ingredients are used:

| | Mg. |
|---|---:|
| N,N-dimethyl-2-[(p-methyl-α-phenylbenzyl)oxy]acetamide | 50 |
| Basis granulate | 150 |
| Diethyl ether, q.s. | |
| Talcum | 10 |
| Magnesium stearate | 5 |

The acetamide compound is dissolved in an appropriate amount of diethyl ether. The solution is mixed with the basis granulate and the diethyl ether is removed by evaporation. The dry mixture is passed through a sieve of 25 mesh. The talcum and magnesium stearate are passed through a sieve of 50 mesh and mixed with the granulate containing the acetamide compound. Tablets are compressed in the usual manner.

Example XIV

A basis granulate is prepared according to the procedure described in Example XIII. For the preparation of tablets weighing 250 mg. the following ingredients are used:

| | Mg. |
|---|---:|
| N,N-dimethyl-2-[(o-methyl-α-phenylbenzyl)oxy]acetamide | 50 |
| Basis granulate | 140 |
| Talcum | 8 |
| Magnesium stearate | 2 |

The ingredients are sieved through a sieve of 50 mesh and mixed. Tablets are compressed in the usual manner.

The invention is not to be construed as being limited to the particular embodiments described herein, as these are intended to be illustrative rather than restrictive.

What I claim and desire to secure by Letters Patent is:

1. A benzhydroxyacetamide of the formula:

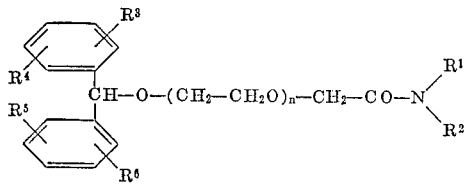

in which $R^1$, $R^2$ and $R^3$ each is an alkyl group of 1 to 4 carbon atoms, $R^4$, $R^5$ and $R^6$ each is a hydrogen atom or an alkyl group of 1 to 4 carbon atoms, each of said $R^3$, $R^4$, $R^5$ and $R^6$ occupies an ortho or para position and $n$ is 0 or 1.

2. A benzhydryloxyacetamide according to claim 1, in which $R^1$ and $R^2$ are methyl groups and $n$ is zero.

3. A benzhydryloxyacetamide of the formula

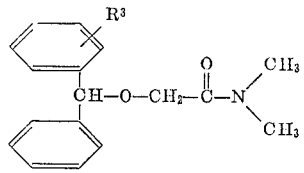

in which $R^3$ is a methyl or tertiary butyl group in the ortho or para position.

4. A benzhydryloxyacetamide according to claim 1 in which each of $R^1$ and $R^2$ is methyl, and each of said $R^4$, $R^5$ and $R^6$ is a hydrogen atom or a methyl group.

5. The benzhydryloxyacetamide according to claim 3, in which $R^3$ is a tertiary butyl group at the ortho position.

6. The benzhydryloxyacetamide according to claim 3, in which $R_3$ is a tertiary butyl group at the ortho position.

7. A benzhydryloxyacetamide of the formula

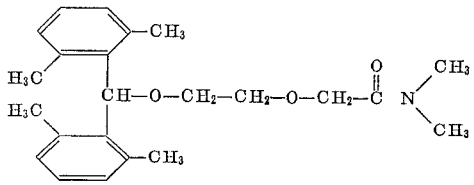

References Cited

UNITED STATES PATENTS 2,948,754   8/1960   Litvan et al.

OTHER REFERENCES

Djerassi et al., J. Orig. Chem., vol. 13, pp. 830–33 (1949).

Fones, J. Orig. Chem., vol. 14, pp. 1099–1102 (1950).

Fulde, Berichte, vol. 68, pp. 752–53 (1935).

Hickenbottom, Reactions of Organic Compounds, (2nd ed.), p. 109 (1948) (Longmans, Green & Co., N.Y.).

Wagner et al., Synthetic Organic Chemistry (1953), pp. 568–9 (J. Wiley & Sons, N.Y.).

HENRY R. JILES, Primary Examiner

HARRY I. MOATZ, Assistant Examiner

U.S. Cl. X.R.

71—118; 424—324; 260—473, 570.7, 561, 615